(12) United States Patent
Seo et al.

(10) Patent No.: US 8,900,697 B2
(45) Date of Patent: Dec. 2, 2014

(54) SURFACE MODIFIED SILICA BY ALKYL SULFONATED TETRAZOLE COMPOUND, PREPARING METHOD THEREOF, AND RESIN COMPOSITION CONTAINING THE SAME

(71) Applicant: Samsung Electro-Mechanics Co., Ltd., Suwon-si (KR)

(72) Inventors: Young Kwan Seo, Suwon-si (KR); Jin Won Lee, Suwon-si (KR); Sung Nam Cho, Suwon-si (KR); Jun Young Kim, Suwon-si (KR); Hyun Jung Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/139,395

(22) Filed: Dec. 23, 2013

(65) Prior Publication Data

US 2014/0187677 A1    Jul. 3, 2014

(30) Foreign Application Priority Data

Dec. 28, 2012  (KR) .................. 10-2012-0156600

(51) Int. Cl.
| | | |
|---|---|---|
| *B32B 27/20* | (2006.01) | |
| *B32B 27/04* | (2006.01) | |
| *B32B 27/26* | (2006.01) | |
| *B32B 27/38* | (2006.01) | |
| *B32B 1/00* | (2006.01) | |
| *C08K 9/04* | (2006.01) | |
| *C08K 3/36* | (2006.01) | |
| *C08L 63/00* | (2006.01) | |
| *C08G 59/20* | (2006.01) | |
| *C08G 59/40* | (2006.01) | |

(52) U.S. Cl.
CPC .......................................... *C08K 9/04* (2013.01)
USPC ........ 428/297.4; 428/402; 428/403; 428/404; 428/413; 523/443; 523/453; 523/461; 523/466

(58) Field of Classification Search
USPC .............. 428/297.4, 402, 403, 404, 413, 901; 523/443, 453, 461, 466; 548/250, 251, 548/252, 253, 254
See application file for complete search history.

(56) References Cited

U.S. PATENT DOCUMENTS

| 4,322,459 A | 3/1982 | Castellucci | |
|---|---|---|---|
| 2005/0247237 A1* | 11/2005 | Schukat et al. | ............... 106/472 |
| 2013/0209760 A1* | 8/2013 | Seo et al. | ...................... 428/209 |

FOREIGN PATENT DOCUMENTS

EP    0665468 A1    8/1995

* cited by examiner

*Primary Examiner* — Michael J Feely
(74) *Attorney, Agent, or Firm* — Ladas & Parry, LLP

(57) ABSTRACT

This invention relates to a surface modified silica by an alkyl sulfonated tetrazole compound, a preparation method thereof, and a resin composition containing the same. The silica according to this invention can exhibit superior adhesion to a metal.

13 Claims, 1 Drawing Sheet

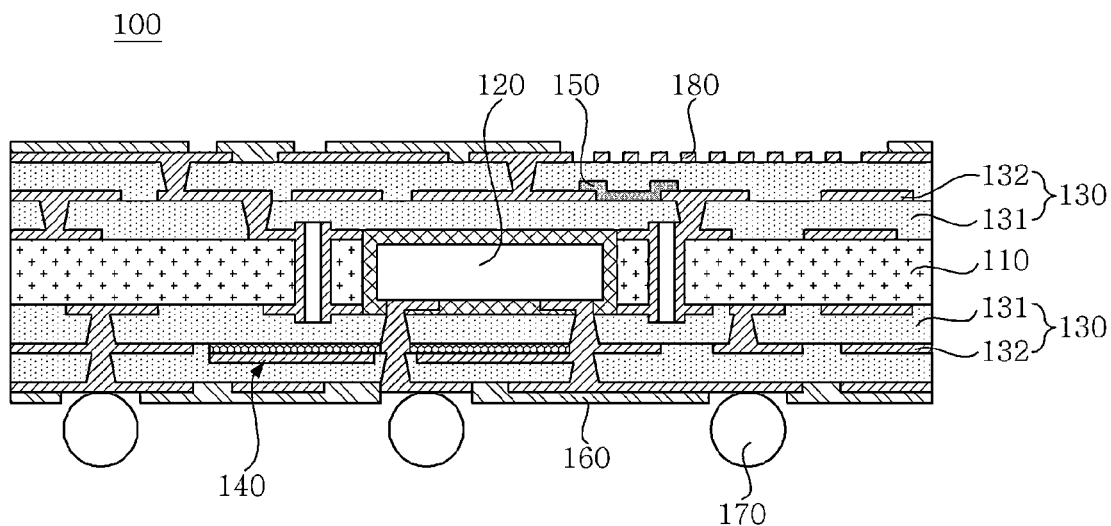

SURFACE MODIFIED SILICA BY ALKYL SULFONATED TETRAZOLE COMPOUND, PREPARING METHOD THEREOF, AND RESIN COMPOSITION CONTAINING THE SAME

CROSS-REFERENCE TO RELATED APPLICATION

This application claims the benefit of Korean Patent Application No. 10-2012-0156600, filed Dec. 28, 2012, entitled "Surface modified silica by alkyl sulphonated tetrazole compound, preparing method thereof, and resin composition containing the same," which is hereby incorporated by reference in its entirety into this application.

BACKGROUND OF THE INVENTION

1. Technical Field

The present invention relates to a surface modified silica by an alkyl sulfonated tetrazole compound, a preparation method thereof, and a resin composition containing the same.

2. Description of the Related Art

Typically, in electronic products such as printed circuit boards, methods of enhancing adhesion or adherence between a resin and a metal include roughening the surface of a resin using desmearing to enhance adherence, or adding an additive to a resin to enhance its adhesive strength (or adhesion). As used herein, the terms "adhesive strength," "adherence," or "adhesion" are used as having the same meaning and represent the bondability with a metal.

In the case of roughening the surface of the resin, as the line width of wiring decreases, low roughness is required and thus the effect of the roughness on enhancing adhesion or adherence becomes weak. Hence, the function of an additive for enhancing adhesion, which is added to the resin, is regarded as important. Examples of the additive for enhancing adhesion to a metal include triazoles or tetrazoles, as disclosed in Patent Document 1.

The additive for enhancing adhesion should be uniformly distributed in the resin to maximize enhancement in adhesion of the resin. In order to uniformly distribute the additive in the resin, such an additive may be added in the form of being dissolved in a solvent, or in the form of powder, and may then be distributed. However, this method is problematic because of compatibility between the solvent and the resin and dispersion stability of the powder. Furthermore, Patent Document 2 discloses an epoxy resin having improved curing properties by adding an azole compound such as triazole or tetrazole to the epoxy resin, but does not suggest an improvement in adhesion.

Patent Document 1: EP 0,665,468
Patent Document 2: U.S. Pat. No. 4,322,459

SUMMARY OF THE INVENTION

Culminating in the present invention, intensive and thorough research with the aim of solving the problems occurring in the related art resulted in the finding that an alkyl sulfonated tetrazole compound obtained by alkyl sulfonation of tetrazole may considerably enhance adhesion to a metal.

Accordingly, a first aspect of the present invention is to provide a silica having enhanced adhesion to a metal by attaching an alkyl sulfonated tetrazole compound to the surface of silica as an inorganic filler.

A second aspect of the present invention is to provide a method of economically preparing the surface modified silica by the alkyl sulfonated tetrazole compound.

A third aspect of the present invention is to provide a resin composition for a printed circuit board, containing the surface modified silica by the alkyl sulfonated tetrazole compound.

A fourth aspect of the present invention is to provide an insulating film, which may be formed using the resin composition thus exhibiting superior adhesion to a metal while maintaining heat resistance and mechanical properties.

A fifth aspect of the present invention is to provide a prepreg having superior adhesion to a metal by impregnating a base material with the resin composition.

In order to accomplish the above first aspect of the present invention, a surface modified silica by an alkyl sulfonated tetrazole compound represented by Chemical Formula 1 below (hereinafter, referred to as "the first invention") is provided.

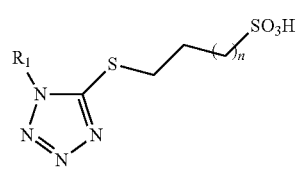

[Chemical Formula 1]

In Chemical Formula 1, $R_1$ is selected from the group consisting of C1~20 aliphatic or alicyclic alkyl, C1~20 aryl or aralkyl, C1~20 functional group-substituted alkyl or aryl, a ring connected by alkylene with or without a hetero atom, a polymer compound and derivatives thereof; and n is an integer of 1~6.

In the first invention, the silica may have an average particle size of 0.05~5 μm.

In order to accomplish the above second aspect of the present invention, a method of preparing the surface modified silica by the alkyl sulfonated tetrazole compound (hereinafter, referred to as "the second invention") is provided, which includes reacting silica with sodium ethoxide, thus obtaining a reaction product, and reacting the reaction product with an alkyl sulfonated tetrazole compound represented by Chemical Formula 1 below.

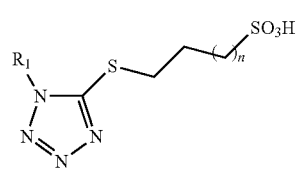

[Chemical Formula 1]

In Chemical Formula 1, $R_1$ is selected from the group consisting of C1~20 aliphatic or alicyclic alkyl, C1~20 aryl or aralkyl, C1~20 functional group-substituted alkyl or aryl, a ring connected by alkylene with or without a hetero atom, a polymer compound and derivatives thereof; and n is an integer of 1~6.

In the second invention, the reacting the silica with the sodium ethoxide may be performed by mixing the silica and the sodium ethoxide at a weight ratio of 1~10:1 at 20~60° C.

In the second invention, the reacting the reaction product with the alkyl sulfonated tetrazole compound may be performed by mixing the reaction product with the alkyl sulfonated tetrazole compound at a weight ratio of 1~10:1 at 20~40° C.

In order to accomplish the above third aspect of the present invention, a resin composition for a printed circuit board (hereinafter, referred to as "the third invention") is provided, which includes an epoxy resin, and the surface modified silica by the alkyl sulfonated tetrazole compound according to the first invention.

In the third invention, the amount of the silica may be 10~90 wt %.

In the third invention, the epoxy resin may include one or more selected from the group consisting of a naphthalenic epoxy resin, a bisphenol A type epoxy resin, a phenol novolac epoxy resin, a cresol novolac epoxy resin, a rubber modified epoxy resin, and a phosphorous epoxy resin.

In the third invention, the resin composition may further include a curing agent comprising one or more selected from the group consisting of an amide-based curing agent, a polyamine-based curing agent, an acid anhydride curing agent, a phenol novolac type curing agent, a polymercaptan curing agent, a tertiary amine curing agent, and an imidazole curing agent.

In the third invention, the resin composition may further include a curing accelerator comprising one or more selected from the group consisting of a metallic curing accelerator, an imidazole-based curing accelerator, and an amine-based curing accelerator.

In the third invention, the resin composition may further include a thermoplastic resin comprising one or more selected from the group consisting of a phenoxy resin, a polyimide resin, a polyamideimide (PAI) resin, a polyetherimide (PEI) resin, a polysulfone (PS) resin, a polyethersulfone (PES) resin, a polyphenyleneether (PPE) resin, a polycarbonate (PC) resin, a polyetheretherketone (PEEK) resin, and a polyester resin.

In order to accomplish the above fourth aspect of the present invention, an insulating film for a printed circuit board is provided, which is manufactured using the resin composition according to the third invention.

In order to accomplish the above fifth aspect of the present invention, a prepreg for a printed circuit board is provided, which is manufactured by impregnating a base material with the resin composition according to the third invention.

BRIEF DESCRIPTION OF THE DRAWING

FIG. 1 is a cross-sectional view illustrating a typical printed circuit board to which a resin composition according to the present invention may be applied.

DESCRIPTION OF SPECIFIC EMBODIMENTS

Before the present invention is described in more detail, the terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention. It is noted that, the embodiments of the present invention are merely illustrative, and are not construed to limit the scope of the present invention, and thus there may be a variety of equivalents and modifications able to substitute for them at the point of time of the present application.

In the following description, it is to be noted that embodiments of the present invention are described in detail so that the present invention may be easily performed by those skilled in the art, and also that, when known techniques related with the present invention may make the gist of the present invention unclear, a detailed description thereof will be omitted.

FIG. 1 is a cross-sectional view illustrating a typical printed circuit board to which a resin composition according to the present invention may be applied. As illustrated in FIG. 1, a printed circuit board 100 may be an embedded board including electronic parts therein. Specifically, the printed circuit board 100 may include an insulator or prepreg 110 having a cavity, an electronic part 120 provided in the cavity, and build-up layers 130 formed on one or more of the upper and lower surfaces of the insulator or prepreg 110 including the electronic part 120. The build-up layers 130 may include insulating layers 131 formed on one or more of the upper and lower surfaces of the insulator 110, and circuit layers 132 which are formed on the insulating layers 131 and may achieve interlayer connection.

An example of the electronic part 120 may include an active device such as a semiconductor device. Also, the printed circuit board 100 may further include one or more additional electronic parts, for example, a capacitor 140, a resistor 150, etc., in addition to the single electronic part 120. In embodiments of the present invention, the kind or number of the electronic parts is not limited. As such, the insulator or prepreg 110 and the insulating layers 131 play a role in imparting insulating properties between the circuit layers or between the electronic parts, and also function as a support for maintaining rigidity of a package.

In the case where the wiring density of the printed circuit board 100 is increased, to decrease noise between the circuit layers and also to reduce parasitic capacitance, the insulator or prepreg 110 and the insulating layers 131 should have low dielectric properties. Furthermore, the insulator or prepreg 110 and the insulating layers 131 should have low dielectric loss to increase insulating properties. At least any one of the insulator or prepreg 110 and the insulating layers 131 has to have rigidity while decreasing dielectric constant and dielectric loss.

In one embodiment, the present invention provides surface modified silica, which is formed by attaching an alkyl sulfonated tetrazole compound having good chemical adhesion to a metal to the surface of silica which is used as an inorganic filler of an insulating material. An insulating film or a prepreg using the surface modified silica may maintain good adhesion even when the amount of the silica is increased.

Useful in the present invention, the alkyl sulfonated tetrazole compound is represented by Chemical Formula 1 below.

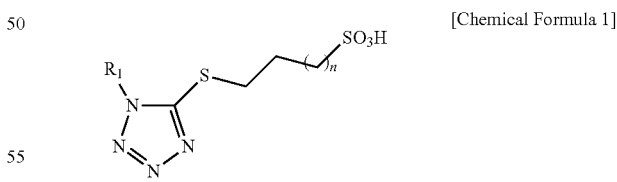

[Chemical Formula 1]

In Chemical Formula 1, $R_1$ is selected from the group consisting of C1~20 aliphatic or alicyclic alkyl, C1~20 aryl or aralkyl, C1~20 functional group-substituted alkyl or aryl, a ring to connected by alkylene with or without a hetero atom, a polymer compound and derivatives thereof, and is preferably C1~10 aliphatic or alicyclic alkyl, C1~10 aryl or aralkyl, C1~10 functional group-substituted alkyl or aryl, a ring connected by alkylene with or without a hetero atom, a polymer compound and derivatives thereof, and n is an integer of 1~6, and preferably an integer of 3 or 4.

According to the present invention, in the case where tetrazole and an epoxy compound are reacted as represented by Scheme 1 below, when a thiol functional group (—SH group) directly ring-opens the epoxy group of the epoxy compound and is thus connected thereto, the —S— group does not donate electrons as needed to ensure adhesion by means of the OH group adjacent thereto, undesirably making it impossible to obtain satisfactory adhesion.

[Scheme 1]

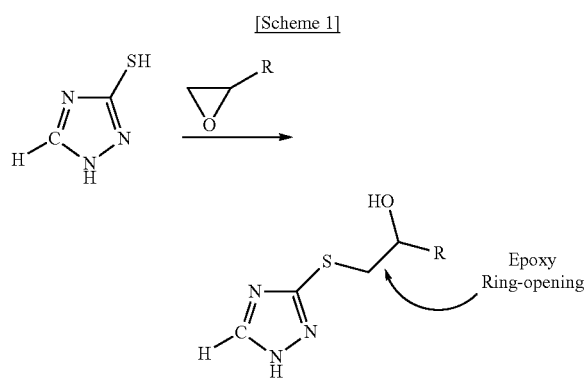

In Scheme 1, R is an epoxy compound.

Hence, in the present invention, tetrazole represented by Chemical Formula 2 below is subjected to alkyl sulfonation with alkyl sulfone represented by Chemical Formula 3 below so that an alkyl group having an appropriate size is introduced to design a structure able to donate electrons as needed to ensure adhesion by the —S— group.

[Chemical Formula 2]

[Chemical Formula 3]

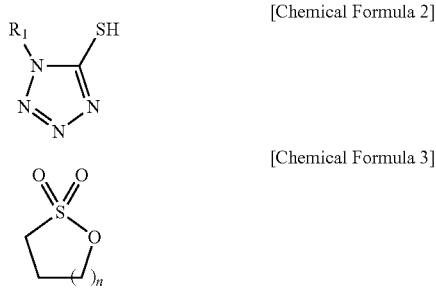

In Chemical Formulas 1 and 2, $R_1$ and n are defined as above.

The preparation of the alkyl sulfonated tetrazole compound represented by Chemical Formula 1 is shown in Scheme 2 below, and is typically carried out in the presence of a solvent. The molar ratio of tetrazole of Chemical Formula 2 to alkyl sulfone of Chemical Formula 3 is stoichiometrically set to 1:0.5~1.5.

[Scheme 2]

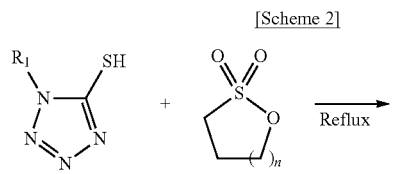

-continued

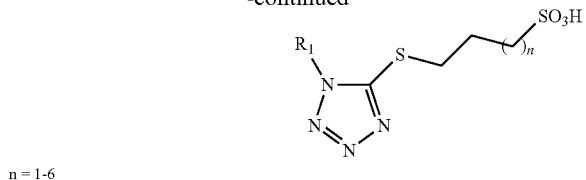

n = 1-6

In Scheme 2, $R_1$ and n are defined as above.

In the present invention, particularly useful as the alkyl sulfonated tetrazole compound is 3-(1-methyl-1H-tetrazol-5-ylthio)propane-1-sulfonic acid or 3-(1-methyl-1H-tetrazol-5-ylthio)butane-1-sulfonic acid in consideration of adhesion of a final epoxy resin.

In another embodiment, the present invention provides a method of preparing the surface modified silica by the alkyl sulfonated tetrazole compound of Chemical Formula 1 includes, as represented by Scheme 3 below, reacting silica with sodium ethoxide thus obtaining a reaction product which is then reacted with the alkyl sulfonated tetrazole compound of Chemical Formula 1.

[Scheme 3]

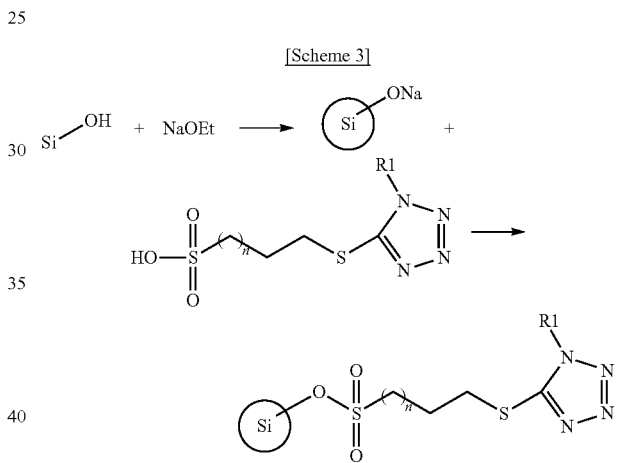

The average particle size of the silica is not particularly limited, but may be set to 0.05~5 μm to follow the recent trend of reducing the size of electronic products such as printed circuit boards.

According to the present invention, the reaction between silica and sodium ethoxide is not particularly limited, but silica and sodium ethoxide may be mixed at a weight ratio of 1~10:1 at 20~60° C. taking into consideration the reaction efficiency and profitability. The reaction between the resulting reaction product and the alkyl sulfonated tetrazole compound is not particularly limited, but these compounds may be mixed at a weight ratio of 1~10:1 at 20~40° C. taking into consideration the reaction efficiency and profitability. If the amount of the added alkyl sulfonated tetrazole compound is low, surface modification of silica does not sufficiently occur. In contrast, if the amount thereof is excessive, purification time becomes longer.

In a further embodiment, the present invention provides a resin composition for a printed circuit board, including an epoxy resin, and the surface modified silica by the alkyl sulfonated tetrazole compound of Chemical Formula 1.

The resin composition according to the present invention includes an epoxy resin in order to increase handleability of the dried resin composition as an adhesive film. The epoxy resin is not particularly limited, but indicates a resin including one or more epoxy groups, preferably two or more epoxy groups, and more preferably four or more epoxy groups, in the molecule thereof.

Examples of the epoxy resin usable in the present invention may include bisphenol A type epoxy resin, bisphenol F type epoxy resin, bisphenol S type epoxy resin, phenol novolac epoxy resin, alkylphenol novolac epoxy resin, biphenyl type epoxy resin, aralkyl type epoxy resin, dicyclopentadiene type epoxy resin, naphthalenic epoxy resin, naphthol type epoxy resin, epoxy resin including a condensate of phenol and aromatic aldehyde having a phenolic hydroxyl group, biphenylaralkyl type epoxy resin, fluorene type epoxy resin, xantene type epoxy resin, triglycidyl isocyanurate, rubber modified epoxy resin and phosphorous epoxy resin. Particularly useful is naphthalenic epoxy resin, bisphenol A type epoxy resin, phenol novolac epoxy resin, cresol novolac epoxy resin, rubber modified epoxy resin, or phosphorous epoxy resin. These epoxy resins may be used alone or in combination of two or more.

The epoxy resin may be used in an amount of 10~90 wt %. If the amount of the epoxy resin is less than 5 wt %, handleability may decrease. In contrast, if the amount thereof exceeds 90 wt %, the amounts of the other components may be comparatively decreased, undesirably lowering dielectric tangent, dielectric constant, and coefficient of thermal expansion.

The resin composition according to the present invention may optionally include a curing agent in order to attain desired process efficiency. The curing agent may include one or more selected from the group consisting of an amide-based curing agent, a polyamine-based curing agent, an acid anhydride curing agent, a phenol novolac type curing agent, a polymercaptan curing agent, a tertiary amine curing agent, and an imidazole curing agent, but is not particularly limited thereto.

The curing agent may be used in an amount of 0.1~3 wt %. If the amount of the curing agent is less than 0.1 wt %, high-temperature curing does not occur well or the curing rate may decrease. In contrast, if the amount thereof exceeds 3 wt %, the curing rate becomes too fast and thus this agent makes it difficult to apply to the process or storage stability may decrease. Furthermore, the unreacted curing agent may remain after reaction, thus increasing moisture absorption of an insulating film or a prepreg, undesirably deteriorating electrical properties.

The resin composition according to the present invention includes the surface modified silica by the alkyl sulfonated tetrazole compound of Chemical Formula 1 as an inorganic filler to decrease the coefficient of thermal expansion (CTE) of the epoxy resin and to enhance adhesion to a metal. The amount of the inorganic filler in the resin composition does not need to be particularly limited depending on the required properties in consideration of the end uses of the resin composition to decrease CTE and to increase adhesion to a metal, but may be set to 10~90 wt %. If the amount of the inorganic filler is less than 10 wt %, dielectric tangent is low and CTE may increase. In contrast, if the amount thereof exceeds 90 wt %, adhesive strength may decrease.

In the present invention, in the case when the amount of silica is increased to decrease CTE of an insulating resin, surface modified silica according to the present invention is more effective when achieving low roughness (Ra<0.3 μm) of an insulating resin.

According to the present invention, another inorganic filler may be further included, in addition to the above inorganic filler, and specific examples thereof may include silica, alumina, barium sulfate, talc, clay, mica powder, aluminum hydroxide, magnesium hydroxide, calcium carbonate, magnesium carbonate, magnesium oxide, boron nitride, aluminum borate, barium titanate, calcium titanate, magnesium titanate, bismuth titanate, titanium oxide, barium zirconate, and calcium zirconate, which may be used alone or in combination of two or more. Particularly useful is silica having low dielectric tangent.

Furthermore, in the case where the average particle size of the inorganic filler exceeds 5 μm, it is difficult to stably form a fine pattern upon forming a circuit pattern on a conductor layer. Hence, the average particle size thereof is set to 5 μm or less. In order to increase moisture resistance, the inorganic filler may be surface-treated with a surface treating agent such as a silane coupling agent, etc. Particularly useful is silica having a diameter of 0.05~2 μm.

The resin composition according to the present invention may optionally include a curing accelerator to achieve efficient curing. The curing accelerator used in the present invention may include a metallic curing accelerator, an imidazole-based curing accelerator, an amine-based curing accelerator, etc., which may be used alone or in combination of two or more in an amount typically used in the art.

Examples of the metallic curing accelerator include, but are not particularly limited to, organic metal complexes or organic metal salts of metal such as cobalt, copper, zinc, iron, nickel, manganese, tin, etc. Specific examples of the organic metal complex include an organic cobalt complex, including cobalt (II) acetylacetonate, cobalt (III) acetylacetonate, etc., an organic copper complex, such as copper (II) acetylacetonate, etc., an organic zinc complex, such as zinc (II) acetylacetonate or the like, an organic iron complex, such as iron (III) acetylacetonate or the like, an organic nickel complex, such as nickel (II) acetylacetonate or the like, an organic manganese complex, such as manganese (II) acetylacetonate, etc. Examples of the organic metal salt include zinc octylate, tin octylate, zinc naphthenate, cobalt naphthenate, tin sterate, zinc stearate, etc. From the point of view of curability and solubility in solvent, cobalt (II) acetylacetonate, cobalt (III) acetylacetonate, zinc (II) acetylacetonate, zinc naphthenate, or iron (III) acetylacetonate may be used as the metallic curing accelerator. Particularly useful is cobalt (II) acetylacetonate or zinc naphthenate. These metallic curing accelerators may be used alone or in combination of two or more.

The imidazole-based curing accelerator is not particularly limited, but examples thereof may include imidazole compounds, including 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1)]-ethyl-s-triazine, 2,4-diamino-6-[2'-methylimidazolyl-(1')]ethyl-s-triazine isocyanurate adducts, 2-phenylimidazole isocyanurate adducts, 2-phenyl-4,5-dihydroxy-methylimidazole, 2-phenyl-4-methyl-5-hydroxymethylimidazole, 2,3-dihydroxy-1H-pyro[1,2-a]benzimidazole, 1-dodecyl-2-methyl-3-benzylimidazolium chloride, 2-methylimidazoline, 2-phenylimidazoline, etc., and adducts of imidazole compound and epoxy resin. These imidazole curing accelerators may be used alone or in combination of two or more.

The amine-based curing accelerator is not particularly limited, but examples thereof may include trialkylamines, including triethylamine, tributylamine, etc., and amine compounds, including 4-dimethylaminopyridine, benzyldimethylamine, 2,4,6-tris(dimethylaminomethyl)phenol, 1,8-diazabicyclo(5,4,0)-undecene (DBU), etc. These amine-based curing accelerators may be used alone or in combination of two or more.

The resin composition according to the present invention may optically include a thermoplastic resin to improve film properties of a resin composition or to improve mechanical properties of a cured product. Examples of the thermoplastic resin include phenoxy resin, polyimide resin, polyamideimide (PAI) resin, polyetherimide (PEI) resin, polysulfone (PS) resin, polyethersulfone (PES) resin, polyphenyleneether (PPE) resin, polycarbonate (PC) resin, polyetheretherketone (PEEK) resin, polyester resin, etc. These thermoplastic resins may be used alone or in combination of two or more. The weight average molecular weight of the thermoplastic resin falls in the range of 5,000~200,000. If the weight average molecular weight thereof is less than 5,000, improvements in film formability or mechanical strength become insignificant. In contrast, if the weight average molecular weight thereof exceeds 200,000, compatibility with the epoxy resin becomes poor, and surface roughness may increase after a curing process, making it difficult to form a high-density fine pattern. The weight average molecular weight was calculated based on the calibration curve of standard polystyrene at a column temperature of 40° C. using LC-9A/RID-6A as a measuring device available from Shimadzu Corporation, Shodex K-800P/K-804L/K-804L as a column available from Showa Denko, and chloroform ($CHCl_3$) as a mobile phase.

In the case where the thermoplastic resin is added to the resin composition according to the present invention, the amount of the thermoplastic resin in the resin composition is not particularly limited but may be set to 0.1~10 wt %, and preferably 1~5 wt %, based on 100 wt % of nonvolatile content of the resin composition. If the amount of the thermoplastic resin is less than 0.1 wt %, there is no improvement in film formability or mechanical strength. In contrast, if the amount thereof exceeds 10 wt %, melting viscosity may increase and the surface roughness of the insulating layer after a wet roughening process may increase.

The insulating resin composition according to the present invention is prepared in the presence of an organic solvent. Taking into consideration solubility and miscibility of the resin and other additives used in the present invention, examples of the organic solvent may include, but are not particularly limited to, 2-methoxy ethanol, acetone, methylethylketone, cyclohexanone, ethyl acetate, butyl acetate, cellosolve acetate, propylene glycol monomethyl ether acetate, ethylene glycol monobutyl ether acetate, cellosolve, butyl cellosolve, carbitol, butyl carbitol, xylene, dimethylformamide, and dimethylacetamide.

The viscosity of the resin composition according to the present invention is 700~1500 cps which is adapted to manufacture an insulating film, and this viscosity corresponds to the extent to which appropriate stickiness may be maintained at room temperature. The viscosity of the resin composition may be adjusted by changing the amount of the solvent. The nonvolatile content of the resin composition, excluding the solvent, may be 30-70 wt %. If the viscosity of the resin composition falls outside of the above range, it is difficult to form an insulating film. Even when such a film is formed, it is difficult to form a predetermined member thereon.

Also, peel strength may be 1.0 kN/m or more when a copper foil with a thickness of 12 µm is used on the insulating film. The insulating film manufactured using the resin composition according to the present invention has a CTE of 15~50 ppm/° C. in the absence of the inorganic filler. Furthermore, glass transition temperature (Tg) may be 210° C. or higher, and preferably 220~270° C.

In addition, the resin composition according to the present invention may further include an additive, such as a softening agent, a leveling agent, a plasticizer, an antioxidant, a fire retardant, a fire retardant adjuvant, a lubricant, an antistatic agent, a colorant, a thermal stabilizer, a light stabilizer, a UV absorber, a coupling agent and/or a precipitation inhibitor, as necessary, provided by those skilled in the art within the scope of the present invention.

The insulating resin composition according to the present invention may be manufactured in the form of a dry film in a semi-solid phase using any process typically known in the art. For example, the resin composition may be formed into a film using a roll coater or a curtain coater and then dried, after which the resulting film is used as an insulating layer (or an insulating film) or a prepreg upon manufacturing a multilayer printed circuit board using a building-up process on a substrate. Such an insulating film or prepreg has a low CTE of 50 ppm/° C. or less.

The prepreg may be manufactured by coating or impregnating a reinforcing material with the resin composition according to the present invention, followed by performing curing and drying to remove the solvent. Examples of the impregnation process may include dip coating, roll coating, etc. Examples of the reinforcing material may include woven glass cloth, woven alumina glass cloth, nonwoven glass cloth, nonwoven cellulose cloth, woven carbon cloth, polymer cloth, etc. Furthermore, there are exemplified glass fibers, silica glass fibers, carbon fibers, alumina fibers, silicon carbide fibers, asbestos, rock wool, mineral wool, gypsum whisker, woven or nonwoven fabric thereof, aromatic polyamide fibers, polyimide fibers, liquid crystalline polyester, polyester fibers, fluorine fibers, polybenzoxazole fibers, glass fibers having polyamide fibers, glass fibers having carbon fibers, glass fibers having polyimide fibers, glass fibers having aromatic polyester, glass paper, mica paper, alumina paper, kraft paper, cotton paper, paper-glass paper, etc. These materials may be used alone or in combination of two or more. As such, glass fibers may have a thickness of 5~200 µm. The resin composition may be used in an amount of about 0.4~3 parts by weight based on 1 part by weight of the reinforcing material. In the case where the resin composition is used in the above range, upon using two or more prepregs, adhesion between the prepregs becomes good and mechanical strength and dimensional stability of the prepregs are superior. The curing process may be carried out at about 150~350° C. Such heat treatment is possible even at low temperature, making it possible to manufacture a printed circuit board.

The prepreg may be coupled with copper. Specifically, a reinforcing material is impregnated with the resin composition according to the present invention, and then subjected to heat treatment in a semi-cured state thus preparing a prepreg which is then positioned on a copper foil, followed by performing heat treatment. When heat treatment is performed following removal of the solvent, a member wherein the copper and the prepreg are coupled with each other is formed. Heating under reduced pressure or ventilation may be conducted to evaporate the solvent. Examples of the coating process may include roller coating, dip coating, spray coating, spin coating, curtain coating, slit coating, screen coating, etc.

Also, a film may be formed using only the solution of the resin composition. Specifically, a solution layer of the resin composition is formed on a substrate using solvent casting, and the solvent is then removed from the solution layer, thereby forming a film on the substrate. Examples of the substrate may include metal foil, such as copper foil, aluminum foil, gold foil, silver foil, etc., or glass wafer, a polyethyleneterephthalate (PET) film, etc.

In still a further embodiment, the present invention provides a printed circuit board manufactured using the resin composition. The printed circuit board may include a film, a printed board, a copper clad laminate, a prepreg or combinations thereof. Also, the printed circuit board may be a copper clad laminate (CCL) or a flexible CCL.

Also, the printed circuit board may include the prepreg as above. In this case, a metal layer may be formed on the prepreg, and the prepreg may then be placed in a press so that it is melted and cured via compression and heating. The metal layer may include copper, aluminum, iron, stainless steel, nickel, etc., or alloys thereof. Furthermore, a printed circuit board having a prepreg and metal layers formed on both sides thereof, or a printed circuit board having a plurality of prepreg layers compressed, may be useful. In addition, a printed circuit board including the prepreg may be variously modified. In exemplary embodiments, a conductive pattern may be formed on either or both sides of the printed circuit board, or a conductive pattern having a multilayer structure such as four layers, eight layers, etc., may be formed.

A better understanding of the present invention may be obtained via the following examples which are set forth to illustrate, but are not to be construed as limiting the present invention.

Example 1

Synthesis of 3-(1-methyl-1H-tetrazol-5-ylthio)propane-1-sulfonic acid 90 g of acetonitrile as a reaction solvent, 20 g (0.172 mol) of 5-mercapto-1-methyltetrazole, and 21 g (0.172 mol) of 1,3-propanesulfone were placed in a 250 ml one-neck flask equipped with a reflux condenser, and then refluxed at about 80° C. in a nitrogen atmosphere. The reaction termination point was determined via TLC (developing solvent chloroform: methanol=10:1) so that the reaction was terminated, after which the reaction product was filtered using Celite 545, and the filtrate was concentrated under reduced pressure and then subjected to silica column chromatography, affording 3-(1-methyl-1H-tetrazol-5-ylthio)propane-1-sulfonic acid. The synthesis yield was 68%, and melting point (DSC) was 98° C.

$^1$H-NMR (CDCl3, δ) 3.63 (s, 3H, tetrazole-CH$_3$), 3.40 (t, 2H, —S—CH$_2$CH$_2$CH$_2$—SO$_3$—), 2.95 (t, 2H, —S—CH$_2$CH$_2$CH$_3$—SO$_3$—), 2.20 (m, 2H, —S—CH$_2$CH$_2$CH$_3$—SO$_3$—)

Example 2

UFP30 (available from Denka) fused silica was dried in a dry oven at 120° C. for 3 hr or loner, and cooled to room temperature in a desiccator so that silica was dewatered. 50 g of silica thus dewatered was dispersed well in 500 g of dichloromethane in a 1 l flask using ultrasonic vibration. 10 g of sodium ethoxide was added, and the resulting mixture was stirred at 40° C. for 2 hr, followed by filtering silica powder using filter paper. To the filtered silica powder, 200 g of dichloromethane and 10 g of 3-(1-methyl-1H-tetrazol-5-ylthio)propane-1-sulfonic acid obtained in Example 1 were added, and the resulting mixture was stirred at room temperature for 5 hr and then transferred into a separatory funnel, after which 200 g of distilled water was added, and thus sodium hydroxide which is a reaction product was extracted. Also, two further extractions were performed, followed by conducting centrifugation using a centrifuge at 3000 rpm for 10 min, so that silica and dichloromethane were separated, after which drying in a dry oven at 80° C. was carried out, thus obtaining 35 g of surface modified silica. The silica thus obtained was subjected to spectrophotometry, and thus the presence of a sulfone group was confirmed as follows.

IR (KBr) (v, cm$^{-1}$); 1350, 1170 (Si—SO$^{3-}$—R), 715 (R—S—R), 1480, 1350, 1300, 1050 (tetrazole ring)

Example 3

100 g of bisphenol A epoxy resin "YD-011" (epoxy equivalent 469, available from Kukdo Chemical) and 4.5 g of Disper BYK-110 (available from BYK) were dissolved in 83 g of methylethylketone (MEK), after which 162.5 g of the surface modified silica obtained in Example 2 was added, and pre-dispersed at 2000 rpm using a homo-mixer for 30 min, and then dispersed for 1 hr using a bead mill. In the resulting dispersion composition, 2 g of 2-ethyl-4-methylimidazole as a curing agent was dissolved, thus preparing a resin vanish, which was then applied on a PET film having a thickness of about 38 μm using a bar coater and then dried for about 10 min so that the thickness of the dried resin was about 40 μm.

Comparative Example 1

100 g of bisphenol A epoxy resin "YD-011" (epoxy equivalent 469, available from Kukdo Chemical) and 250 g of spherical silica slurry (average particle size: 0.3 μm, 65%, solvent MEK) were mixed and dispersed using a bead mill. In the resulting composition, 2 g of 2-ethyl-4-methylimidazole as a curing agent was dissolved, thus preparing a resin vanish, which was then applied on a PET film having a thickness of about 38 μm using a bar coater and then dried for about 10 min so that the thickness of the dried resin was about 40 μm.

Test Example

Lamination of Insulating Resin Sheet

The insulating film obtained in each of Example 3 and Comparative Example 1 was laminated on one side of an inner circuit board having a roughened surface (conductor thickness 18 μm, 0.8 mm) via vacuum suction at about 80° C. for 20 sec and then pressing under conditions of about 80° C. and a pressure of about 7.5 kg/cm$^2$ for 20 sec, using a vacuum pressure type laminator available from MEIKI Co. Ltd.

Curing of Resin Composition

The PET protective film was stripped from the laminated insulating film, followed by performing curing at about 160° C. for about 30 min using a hot air circulation furnace, thus obtaining a laminate in which an insulating layer was formed on one side of the inner circuit board.

Roughening Treatment

The obtained laminate was roughened using a permanganate solution so as to have a surface roughness. The roughening treatment was conducted by immersing the laminate in a swelling solution (Swelling Dip Securiganth P, available from Atotech Japan) at about 60° C. for about 10 min, and then in an oxidation solution (a mixture of Concentrate Compact CP and Dosing Solution Securiganth P, available from Atotech Japan) at about 80° C. for about 20 min. Subsequently, the laminate was further immersed in a reduction solution (Reduction Solution Securiganth P500, available from Atotech Japan) at about 40° C. for about 5 min.

Formation of Conductive Layer Using Plating

Electroless plating was performed on the surface of the insulating layer of the roughened laminate in the presence of a palladium catalyst using tartrate-containing Printganth MSK-DK, available from Atotech Japan, followed by performing electrolytic plating using copper sulfate so as to form a copper layer having a thickness of about 20 μm. After completion of the electrolytic plating, the test sample was finally cured at about 170° C. for about 50 min Evaluation of Adhesive Strength The conductive layer formed via electrolytic plating was cut to a width of 10 mm and a length of 100 mm, and adhesive strength thereof was evaluated at a length of 30 mm at a rate of 50.8 mm/min using 2050 UTM (Universal Testing Machine) available from Zwick. The results are shown in Table 1 below.

TABLE 1

|  | Adhesive strength (kgf/cm) |
|---|---|
| Comp. Ex. 1 | 0.30 |
| Ex. 3 | 0.58 |

As is apparent from Table 1, the epoxy resin containing the alkyl sulfonated tetrazole compound according to the present invention exhibited excellent adhesive strength about two times higher than the typical epoxy resin.

As described hereinbefore, the present invention provides a surface modified silica by an alkyl sulfonated tetrazole compound, a preparation method thereof, and a resin composition containing the same. According to the present invention, the surface modified silica by the alkyl sulfonated tetrazole compound can exhibit superior adhesion to a metal, and an insulating film or prepreg for a printed circuit board, which is manufactured using an epoxy resin composition including the same, can also manifest superior adhesion to a metal.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A surface modified silica by an alkyl sulfonated tetrazole compound represented by Chemical Formula 1 below:

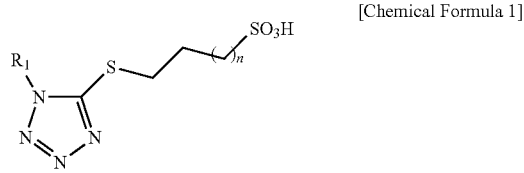

[Chemical Formula 1]

wherein $R_1$ is selected from the group consisting of C1~20 aliphatic or alicyclic alkyl, C1~20 aryl or aralkyl, C1~20 functional group-substituted alkyl or aryl, a ring connected by alkylene with or without a hetero atom, a polymer compound and derivatives thereof; and n is an integer of 1~6.

2. The silica of claim 1, wherein the silica has an average particle size of 0.05~5 μm.

3. A resin composition for a printed circuit board, comprising:
an epoxy resin; and
the surface modified silica by the alkyl sulfonated tetrazole compound of claim 1.

4. The resin composition of claim 3, wherein an amount of the silica is 10~90 wt %.

5. The resin composition of claim 3, wherein the epoxy resin comprises one or more selected from the group consisting of a naphthalenic epoxy resin, a bisphenol A type epoxy resin, a phenol novolac epoxy resin, a cresol novolac epoxy resin, a rubber modified epoxy resin, and a phosphorous epoxy resin.

6. The resin composition of claim 3, further comprising a curing agent comprising one or more selected from the group consisting of an amide-based curing agent, a polyamine-based curing agent, an acid anhydride curing agent, a phenol novolac type curing agent, a polymercaptan curing agent, a tertiary amine curing agent, and an imidazole curing agent.

7. The resin composition of claim 6, further comprising a curing accelerator comprising one or more selected from the group consisting of a metallic curing accelerator, an imidazole-based curing accelerator, and an amine-based curing accelerator.

8. The resin composition of claim 3, further comprising a thermoplastic resin comprising one or more selected from the group consisting of a phenoxy resin, a polyimide resin, a polyamideimide (PAI) resin, a polyetherimide (PEI) resin, a polysulfone (PS) resin, a polyethersulfone (PES) resin, a polyphenyleneether (PPE) resin, a polycarbonate (PC) resin, a polyetheretherketone (PEEK) resin, and a polyester resin.

9. An insulating film for a printed circuit board, manufactured using the resin composition of claim 3.

10. A prepreg for a printed circuit board, manufactured by impregnating a base material with the resin composition of claim 3.

11. A method of preparing a surface modified silica by an alkyl sulfonated tetrazole compound, comprising:
reacting silica with sodium ethoxide, thus obtaining a reaction product; and
reacting the reaction product with an alkyl sulfonated tetrazole compound represented by Chemical Formula 1 below:

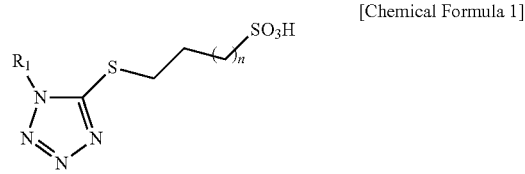

[Chemical Formula 1]

wherein $R_1$ is selected from the group consisting of C1~20 aliphatic or alicyclic alkyl, C1~20 aryl or aralkyl, C1~20 functional group-substituted alkyl or aryl, a ring connected by alkylene with or without a hetero atom, a polymer compound and derivatives thereof; and n is an integer of 1~6.

12. The method of claim 11, wherein the reacting the silica with the sodium ethoxide is performed by mixing the silica and the sodium ethoxide at a weight ratio of 1~10:1 at 20~60° C.

13. The method of claim 11, wherein the reacting the reaction product with the alkyl sulfonated tetrazole compound is performed by mixing the reaction product with the alkyl sulfonated tetrazole compound at a weight ratio of 1~10:1 at 20~40° C.

* * * * *